(12) United States Patent
Khurange (10) Patent No.: US 11,086,662 B2
(45) Date of Patent: Aug. 10, 2021

(54) METHOD AND SYSTEM OF MIGRATING APPLICATIONS TO A CLOUD-COMPUTING ENVIRONMENT

(71) Applicant: Ashish Khurange, Pune (IN)

(72) Inventor: Ashish Khurange, Pune (IN)

( * ) Notice: Subject to any disclaimer, the term of this patent is extended or adjusted under 35 U.S.C. 154(b) by 0 days.

(21) Appl. No.: 15/245,182

(22) Filed: Aug. 24, 2016

(65) Prior Publication Data
US 2018/0260241 A1  Sep. 13, 2018

(51) Int. Cl.
| | |
|---|---|
| *G06F 9/455* | (2018.01) |
| *G06F 9/48* | (2006.01) |
| *G06F 3/06* | (2006.01) |
| *G06F 11/14* | (2006.01) |
| *G06F 9/445* | (2018.01) |
| *G06F 9/50* | (2006.01) |
| *G06F 9/451* | (2018.01) |

(52) U.S. Cl.
CPC .......... *G06F 9/4856* (2013.01); *G06F 3/0604* (2013.01); *G06F 3/065* (2013.01); *G06F 3/067* (2013.01); *G06F 3/0647* (2013.01); *G06F 9/44568* (2013.01); *G06F 9/5072* (2013.01); *G06F 11/1453* (2013.01); *G06F 11/1464* (2013.01); *G06F 9/451* (2018.02); *G06F 9/45558* (2013.01); *G06F 2009/4557* (2013.01); *G06F 2009/45595* (2013.01)

(58) Field of Classification Search
CPC .... G06F 9/4856; G06F 3/0604; G06F 3/0647; G06F 3/065; G06F 3/067; G06F 9/44568; G06F 9/5072; G06F 11/1453; G06F 11/1464; G06F 9/451; G06F 9/45558; G06F 2009/4557; G06F 2009/45595
See application file for complete search history.

(56) References Cited

U.S. PATENT DOCUMENTS

| | | | |
|---|---|---|---|
| 9,722,855 B1* | 8/2017 | Streete | ............ H04L 41/00 |
| 2006/0010176 A1* | 1/2006 | Armington | ............ G06F 9/4856 |
| 2010/0250746 A1* | 9/2010 | Murase | ............ G06F 9/50 |
| | | | 709/226 |
| 2016/0321140 A1* | 11/2016 | Khurange | ............ G06F 11/1448 |

* cited by examiner

*Primary Examiner* — Wissam Rashid (57) ABSTRACT

In one aspect, a computerized method includes the step of selecting a subset of servers of a set of servers to migrate to a specified cloud-computing platform. An administrator utilizes a dashboard view provided in a web browser to identify the subset of servers. The computerized method includes the step of selecting a sequence of migration steps to manage a migration of the subset of servers to the specified cloud-computing platform, wherein the administrator utilizes the dashboard view to generate a plan for a server-data migration of the subset of servers. The computerized method includes the step of automatically determining a set of attributes of the subset of servers. The computerized method includes the step to automatically determining a set of dependency modules associated with the subset of servers to migrate and reinstall upon migration of the subset of servers.

15 Claims, 11 Drawing Sheets

METHOD AND SYSTEM OF MIGRATING APPLICATIONS TO A CLOUD-COMPUTING ENVIRONMENT

BACKGROUND

Field of the Invention

This application relates generally to data storage, and more specifically to a system, article of manufacture and method of migrating applications to a cloud-computing environment.

Description of the Related Art

An enterprise may wish to implement the copying and archiving of computer data so it may be used to restore the original after a data loss event. For example, the enterprise may wish to migrate servers and the server data to a cloud-computing environment. Current methods may lack functionalities that enable the migration of servers to a cloud-computing environment. Many current methods can only be used to migrate archived data in the form of files. Accordingly, improvements to migrating applications to a cloud-computing environment can be implemented.

BRIEF SUMMARY OF THE INVENTION

In one aspect, a computerized method includes the step of selecting a subset of servers of a set of servers to migrate to a specified cloud-computing platform. An administrator utilizes a dashboard view provided in a web browser to identify the subset of servers. The computerized method includes the step of selecting a sequence of migration steps to manage a migration of the subset of servers to the specified cloud-computing platform, wherein the administrator utilizes the dashboard view to generate a plan for a server-data migration of the subset of servers. The computerized method includes the step of automatically determining a set of attributes of the subset of servers. The computerized method includes the step to automatically determining post-recovery operations as a set of dependency modules associated with the subset of servers to, migrate and install upon migration of the subset of servers.

In another aspect, a computer-implemented method for server migration includes the step of providing a set of servers. The computer-implemented method includes the step of identifying a subset of servers of the set of servers to migrate to a specified computing platform. An administrator utilizes a dashboard view provided in a web browser to identify the subset of servers. The computer-implemented method includes the step of providing a sequence of migration steps to manage a migration of the subset of servers to the specified cloud-computing platform. The administrator utilizes the dashboard view to generate a plan for a server migration of the subset of servers. The computer-implemented method includes the step of automatically selecting a set of attributes such as CPU, memory, network settings etc. of the subset of servers. The computer-implemented method includes the step of automatically ascertaining a set of dependency modules associated with the subset of servers to migrate and install upon migration of the subset of servers.

In yet another aspect, a computer-implemented method for migrating server to a cloud-computing environment includes the step of enabling an administrator to use a web browser connected to a migrator software application to add a capture utility to a server and generate a plan for server migration. The computer-implemented method includes the step of capturing an image of the server with the capture utility. The computer-implemented method includes the step of replicating the captured image to a local storage in a dedupe-storage format. The computer-implemented method includes the step of replicating the image to remote storage appliance. The computer-implemented method includes the step of recovering the server in a target-computing environment using the replicated image.

BRIEF DESCRIPTION OF THE DRAWINGS

The Figures described above are a representative set, and are not exhaustive with respect to embodying the invention.

DESCRIPTION

Disclosed are a system, method, and article of manufacture for migrating applications to a cloud-computing environment. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner n one or more embodiments. In the following description, numerous specific details are provided, such as examples of programming, software modules, user selections, network transactions, database queries, database'structures, hardware modules hardware circuits, hardware chips, etc., to provide a thorough understanding of embodiments of the invention. One skilled in the relevant art can recognize, however; that the invention may be practiced without one or ore of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate awaiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach, to creating an application-server implementation, regard to what the application functions are and/or the server portion of a specific implementation instance. The servers function can be dedicated to the execution of procedures (e.g. programs, routines, scripts) for supporting its applied applications. An application server can be an example of a physical server.

Backup image (or image) can include copies of programs, system settings, files, etc. It can be a complete system backup that can be used for restore operations.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage that are generally hosted by third parties. Hosting companies can operate large data centers, and users can have data hosted by leasing storage capacity from said hosting companies. Physically, the resource can span across multiple servers and multiple locations.

Data deduplication (e.g. 'dedupe', 'deduplication') can refer to the elimination of redundant data.

Dedupe storage network can be represented in the form of a graph topology, where a node represents dedupe storage node, and the directed edge represent the data replication path. In dedupe storage network, data is replicated in dedupe-preserving manner. A data chunk which is present at a dedupe storage node is never replicated to that same storage node by any other storage node in the dedupe storage network.

Hypervisor can be a piece of computer software, firmware or hardware that creates and runs virtual machines.

Virtual machine (VM) can be an emulation of a particular computer system.

Thick provisioning cart include the allocation of disk space at creation time. This space may contain stale data on the physical media. Before writing to a new block, a zero can be written, increasing the IOPS on new blocks. The entire disk space can be reserved and unavailable for use by other virtual machines.

Thin provisioning (TP) can be a method of optimizing the efficiency with which the available space is utilized in storage area networks (SAN). TP can operate by allocating disk storage space in a flexible manner among multiple users, based on the minimum space required by each user at any given time.

Additional example definitions are provided herein.

Example Methods

Figure 1:
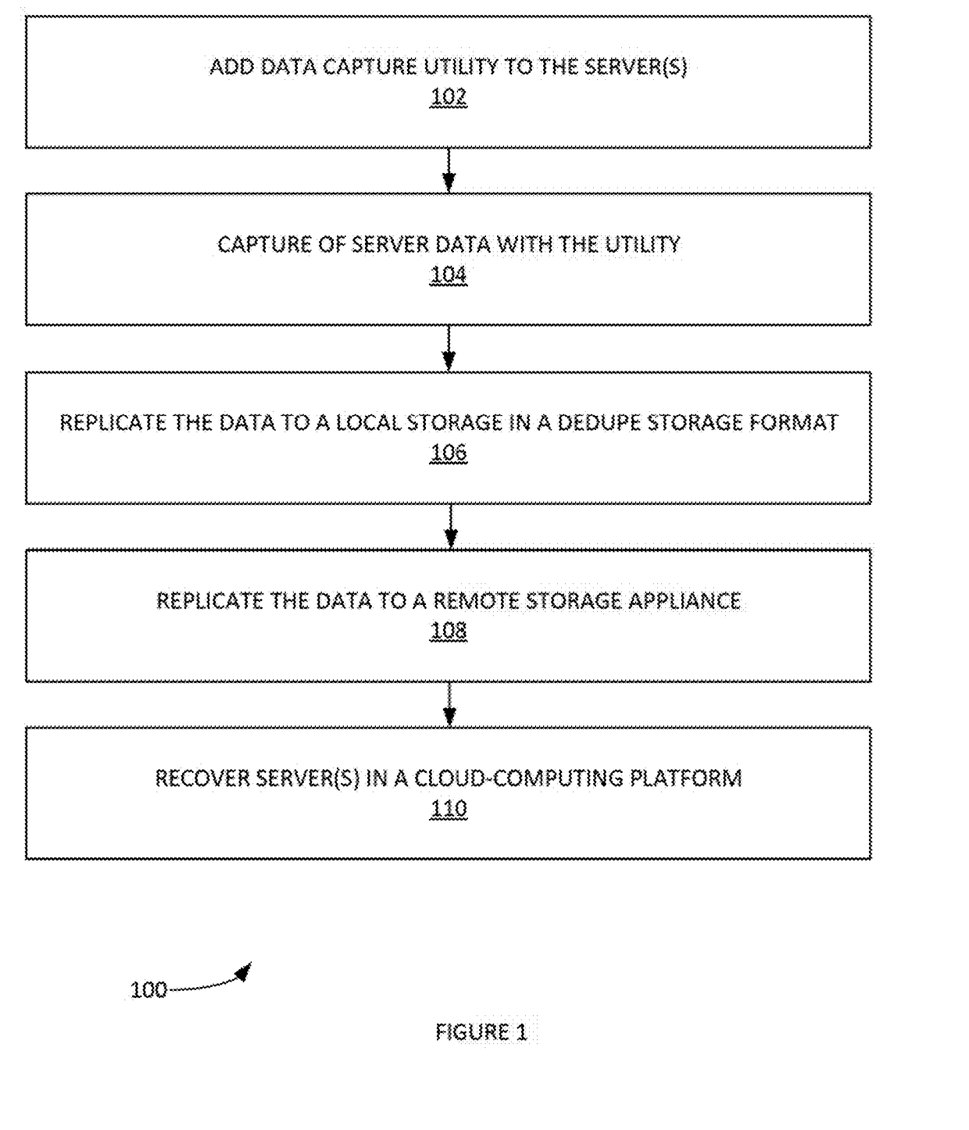
FIG. 1 illustrates an example process for migrating server data to a cloud-computing environment, according to some embodiments.

FIG. 1 illustrates an example process 100 for migrating server data to a cloud-computing environment, according to some embodiments. In step 102, process 100 can add data capture utility to the server(s). In step 104, process 100 can capture server data (e.g. a backup image) with the capture utility. In step 106, process 100 can replicate the data to a local storage in a dedupe storage format. In step 108, process 100 can replicate the data to a remote storage appliance. In step 110, process 100 can recover server(s) in a cloud-computing plateform and/or another remote server-system site.

An administrator can manage process 100. For example, the administrator can use a web browser connected to a migrator software application to manage process 100. It is noted that server data migration can be implemented in an incremental manner (e.g. as provided by process 200 of FIG. 2 infra). The administrator can utilize a dashboard view provided in the web browser to generate a plan for server data migration. After a server is recovered on the target environment (e.g. a specified, cloud-computing platform, etc.), any relevant scripts and/or executables that provide the attributes/functionality of the recovered server can then be pushed to the recovered server from the administrator's computing system (e.g. an administrator's laptop computer, etc.). These relevant scripts and/or executables can then be executed in the recovered server.

Figure 2:
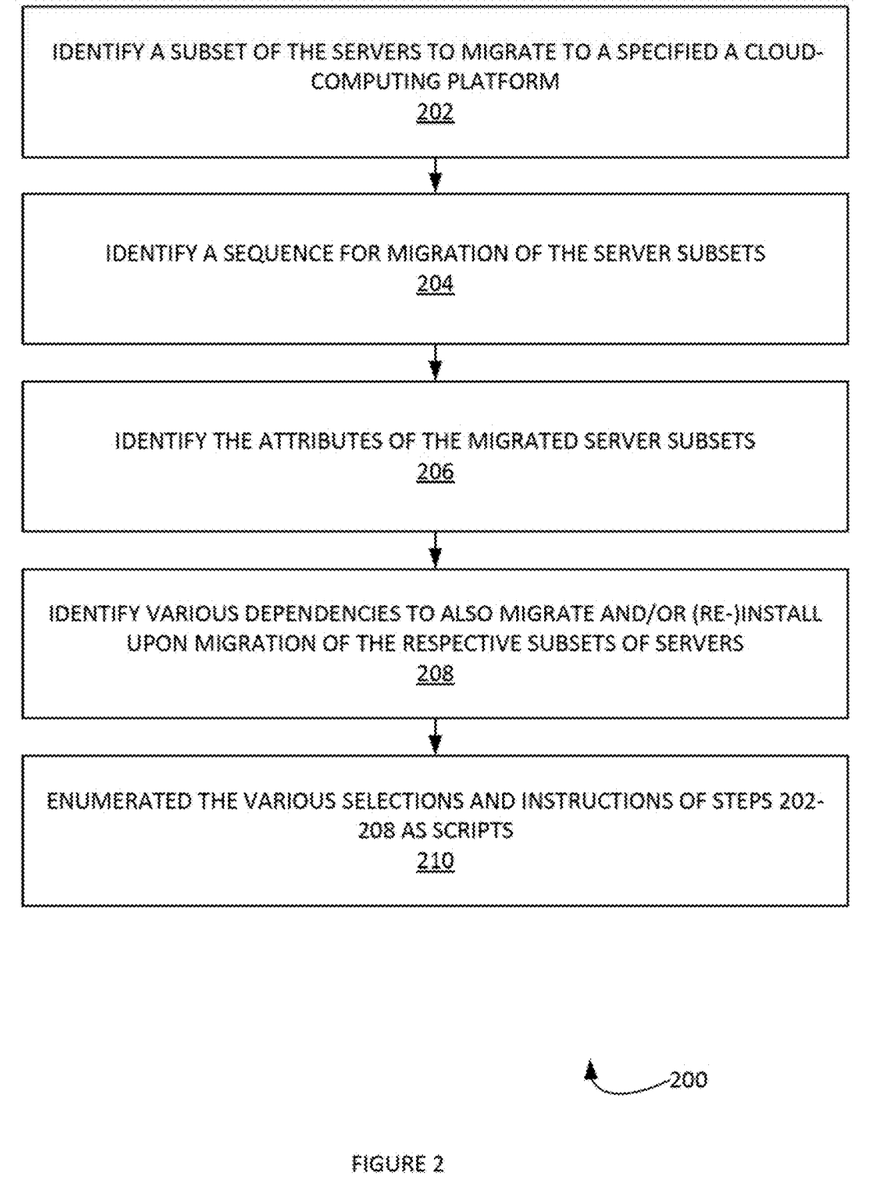
FIG. 2 illustrates an example process for generating a plan of server data migration, according to some embodiments.

FIG. 2 illustrates an example process 200 for generating a plan of server data migration, according to some embodiments. As noted supra, a user can utilize a web browser to access webpages with various user interface options for selecting plan attributes to generate a plan of server data migration. The web browser can communicate the user's instructions to a migration-manager server for implementation. Various examples of said web pages are provided herein (e.g. FIGS. 3-10). In step 202 of process 200, a user (e.g. an administrator) can identify a subset of the servers to migrate to a specified cloud-computing platform. For example, a web site can present a list of available servers to migrate (e.g. in a drop down menu, check-box menu, manual input text box etc.). For example, a set of servers can include database servers, web application servers, load-balancing servers, etc. Step 202 can be repeated for plurality of server subsets. For example, the user can first select a portion of the database servers, then the web application servers, then the load-balancing servers, etc.

In step 204, the user can identify a sequence for migration of the serve subsets. For example, the user can set a portion of database servers to migrate first. Then, when the migration of the database servers is complete, the user can designate the migration of the web application servers to begin. Then, when the migration of the web application servers is complete, the user can designate the load-balancing servers to begin migration.

In step 206, the user can identify the attributes of the migrated server subsets. For example, a user can assign the post-recovery parameters to the post-recovery versions of the servers to be migrated. Example attributes that can be assigned to a server to migrated include, inter alia: a virtual-machine name, central processing unit (CPU) attributes, random-access memory (RAM) attributes, networking attributes, etc. Example networking attributes can include an Internet protocol (IP) address and the like. Step 206 can also specify a target cloud-computing platform and/or other recovery server system. Step 206 can assign a recovery sequence number and attributes to the recovered servers.

In step 208, the user can identify various dependencies to also migrate and/or (re)install upon migration of the respective subsets of servers. A dependency can be a computer-program module that a server relies on and/or uses to implement its functionality. Example dependencies can include, inter alia: anti-virus software, hypervisor tools, cloud monitoring tools, etc. The various selections and instruction's of steps of process 200 can then be enumerated as scripts (e.g. as a computer program written in a scripting language) to be executed during the migration process in step 210. For example, the user selections/instruction can be rendered as executable scripts, shell scripts and the like. Based on the selections/instructions of process 200, various server backup images can be generated and migrated to a cloud-computing platform (e.g. using process 100, etc.). It is noted that a user can specify if a recovered server should have a thin-provisioned disk format or a thick-provisioned disk format (e.g. can depend on relevant virtualization layers).

In some embodiments, process 200 can integrate multiple numbers of post-recovery configuration operations (e.g. may want to upgrade the VMware tools version of software after recovery because the target hypervisor is of a higher version, etc.). A user can specify a set of scripts to implement this integration. Upgrading VMware tools can also include specifying an installer to be attached to the recovered server and executed.

Process 200 can be used to configure/change the licenses of a recovered server. A user can specify a script (e.g. a computer program written in a scripting language) to implement license configuration. A user can also specify dependencies if applicable. These various scripts can be present in the administrator's computing system (e.g. a local laptop, etc.).

Figure 3:
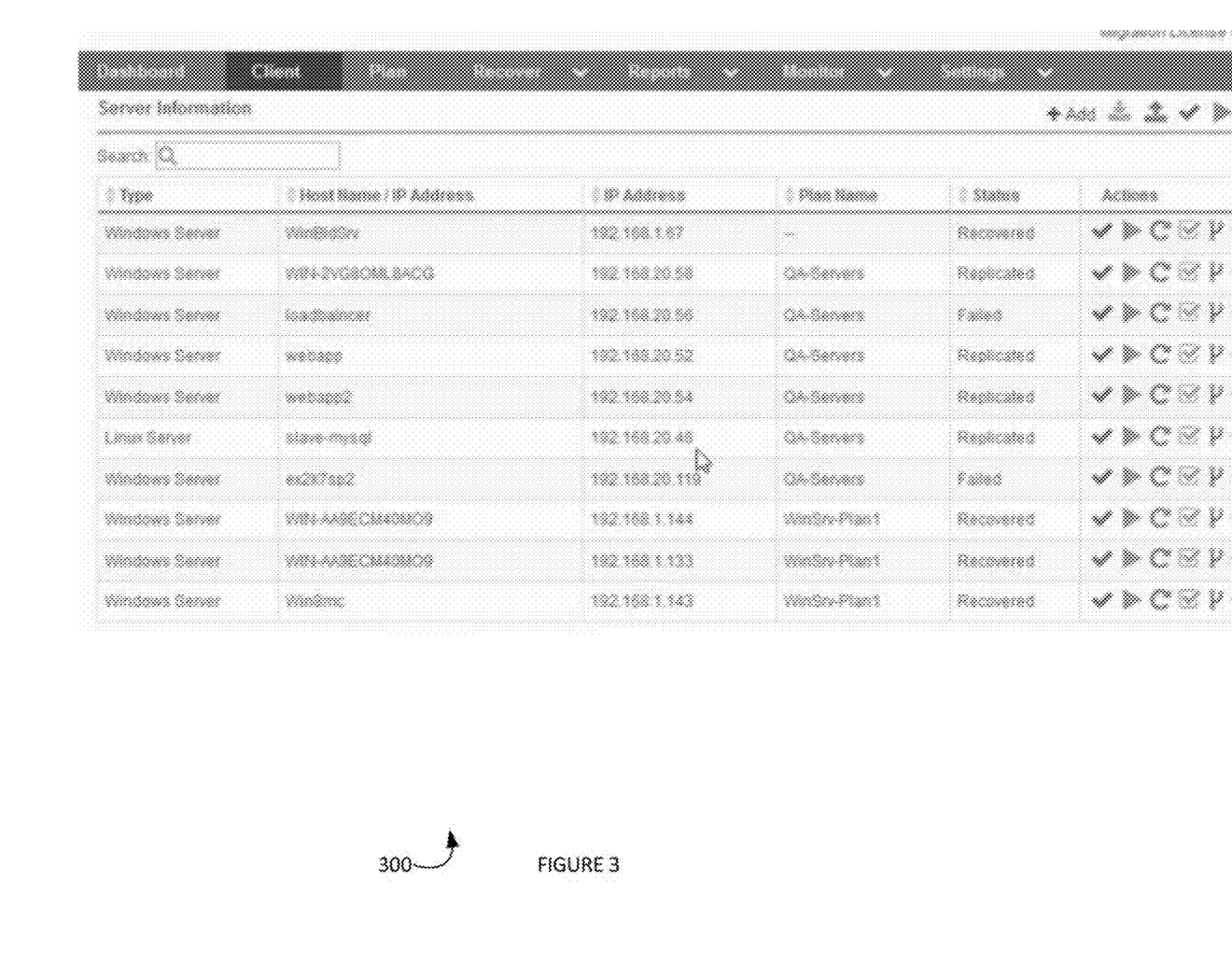
FIG. 3 illustrates an example screen shot of graphical elements that, provide a list of servers available for migration, according to some embodiments.

FIG. 3 illustrates an example screenshot 300 of graphical elements that provide a list of servers available for migration, according to some embodiments. Servers can be identified by IP address. Server status can be displayed. Additional actions can be taken and/or displayed with the various graphical control elements that allow the user to select a predefined set of options.

Figure 4:
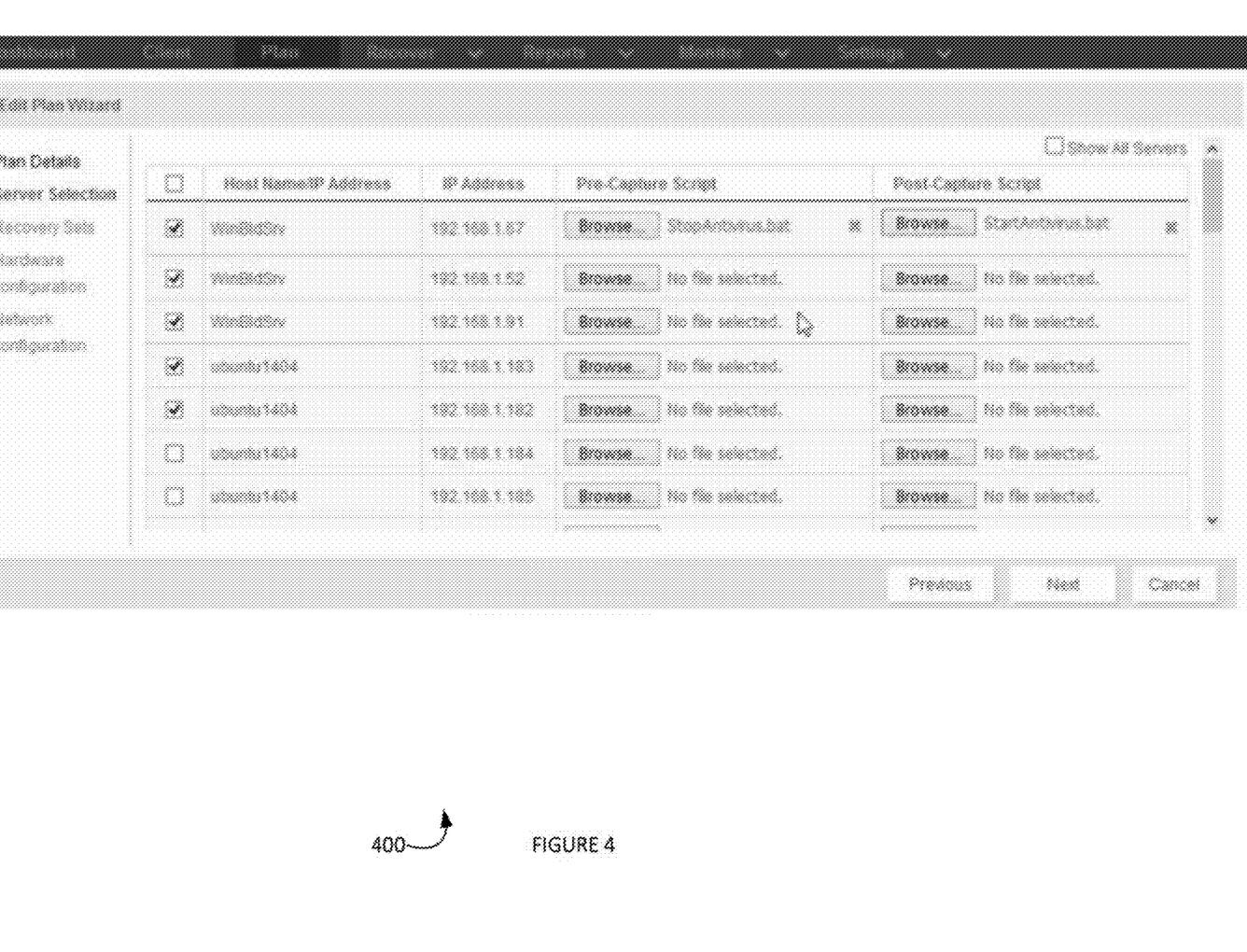
FIG. 4 illustrates n example screen shot providing graphical control elements that enable a user to select servers for backup image capture, according to some embodiments.

FIG. 4 illustrates an example screenshot 400 providing graphical control elements that enable a user to select servers for backup image capture, according to some embodiments. For example, a user can specify the pre and/or post-capture operations for each of the servers with respect to backup image capture. The operations can include, inter alia: turn off antivirus software operations, stop conflicting backup software, quiesce user defined software etc.

Figure 5:
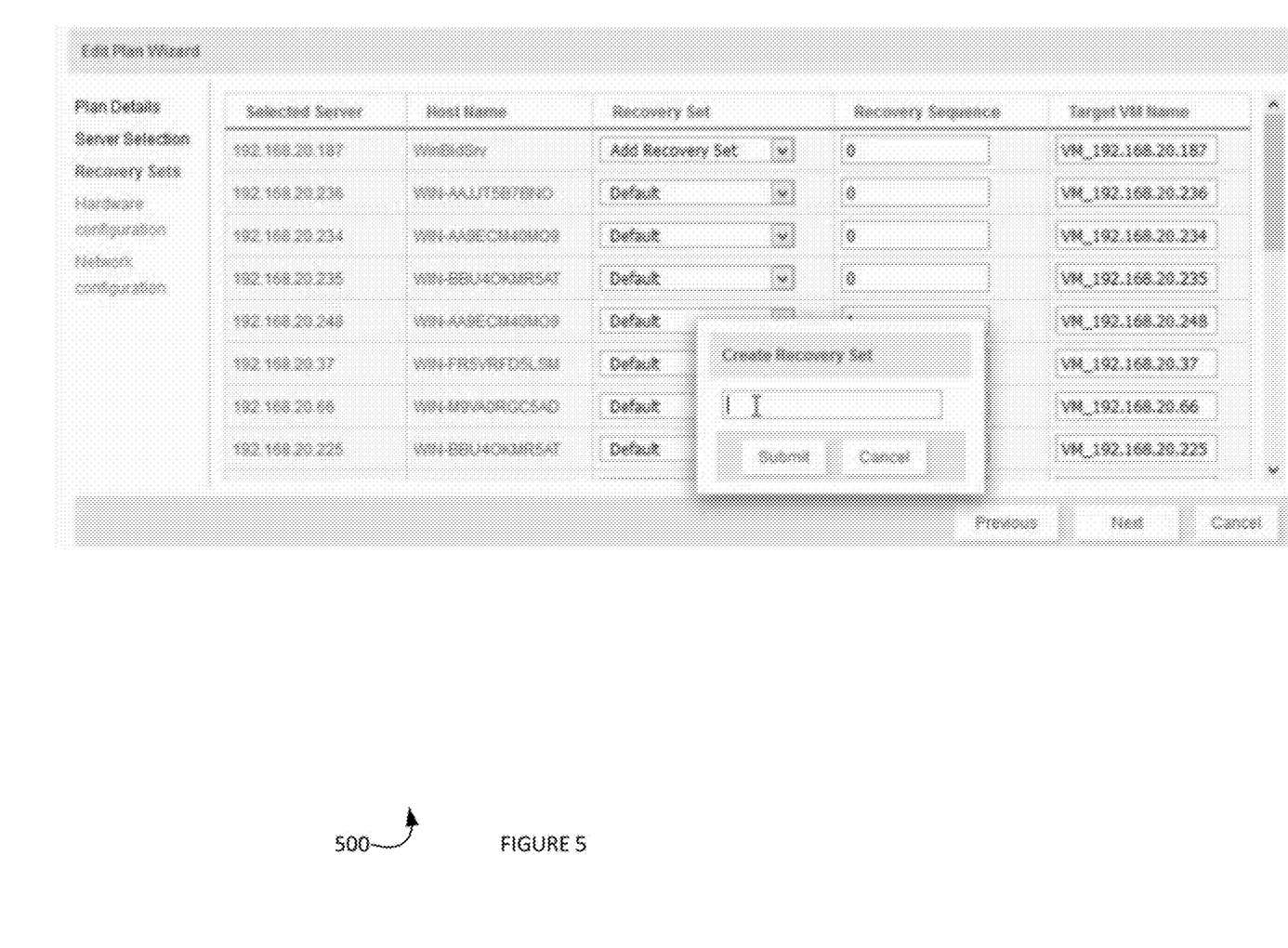
FIG. 5 illustrates an example screenshot of graphical control elements that allow the user to create a recovery set, according to some embodiments.

FIG. 5 illustrates example screenshot 500 of graphical control elements that allow the user to create a recovery set, according to some embodiments. For example, at the time of capture, the user can define the consistency group of servers to be recovered by creating a recovery set. The order in which servers are recovered can be specified by a recovery sequence in the recovery set.

Figure 6:
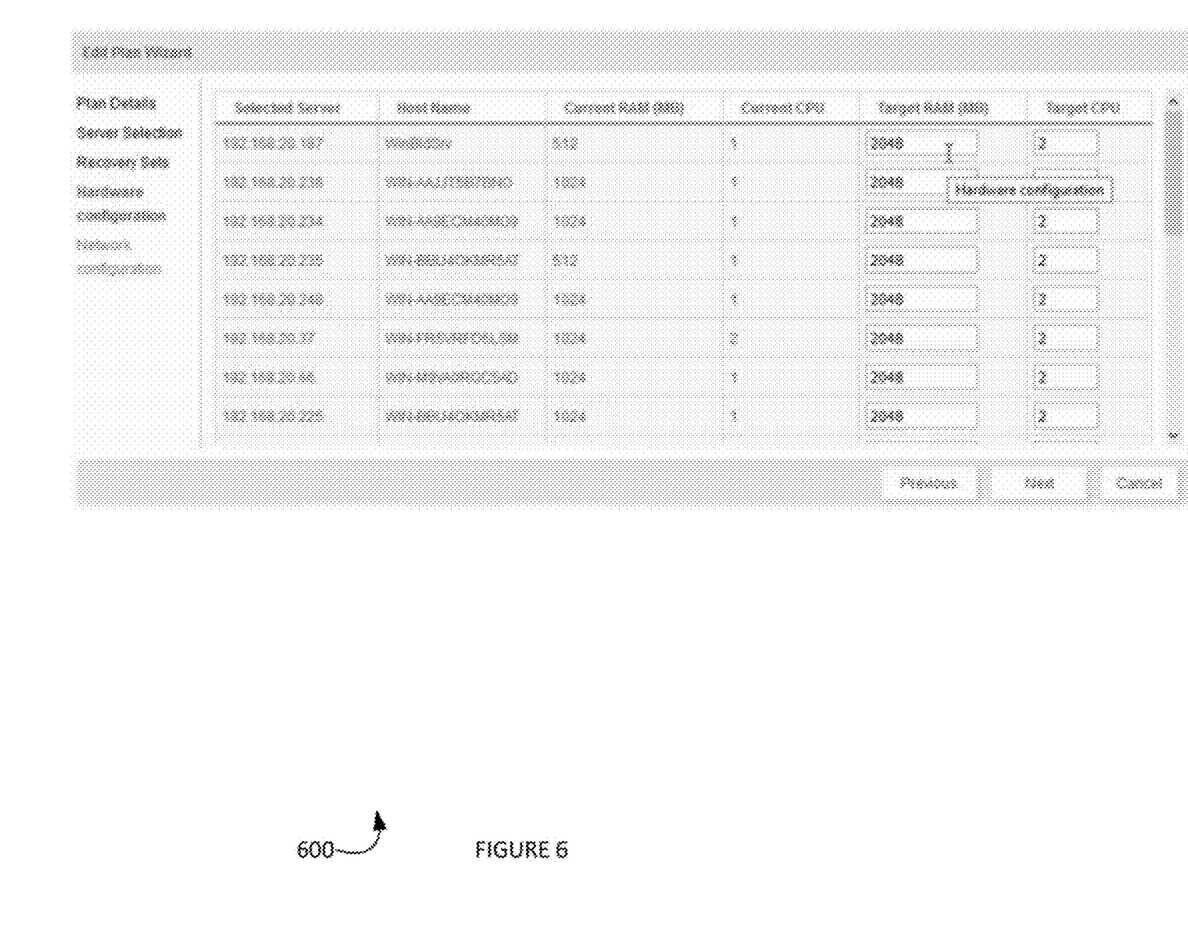
FIG. 6 illustrates an example screenshot of graphical control elements that enable a user to set the hardware configuration of recovered servers, according to some embodiments.

FIG. 6 illustrates an example screenshot 600 of graphical control elements that enable a user to set the hardware configuration (e.g. the RAM and CPU attributes, etc.) of recovered servers, according to some embodiments. For example, a user can specify the RAM and number of CPUs with which the recovered server are to be configured.

Figure 7:
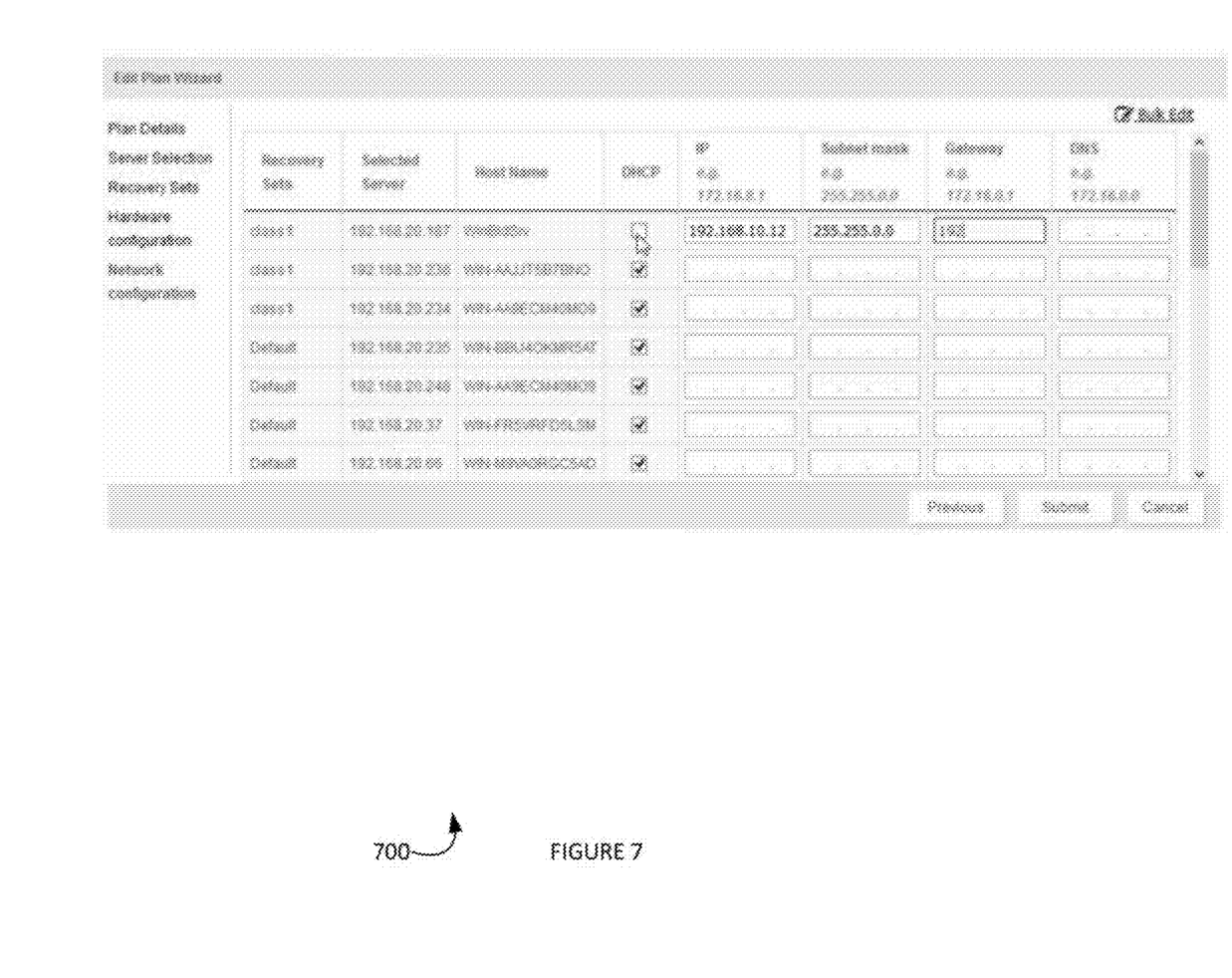
FIG. 7 illustrates an example screenshot of graphical control elements that enable a user to configure the network attributes of recovered servers, according to some embodiments.

FIG. 7 illustrates an example screenshot 700 of graphical control elements that enable a user to configure the network attributes of recovered servers, according to some embodiments. For example, a user can specify network settings of recovered servers. The user can specify if the recovered servers have static/dynamic IP address settings. For a static IP address setting, the user can define the IP address, subnet mask, gateway, DNS entries, etc.

Figure 8:
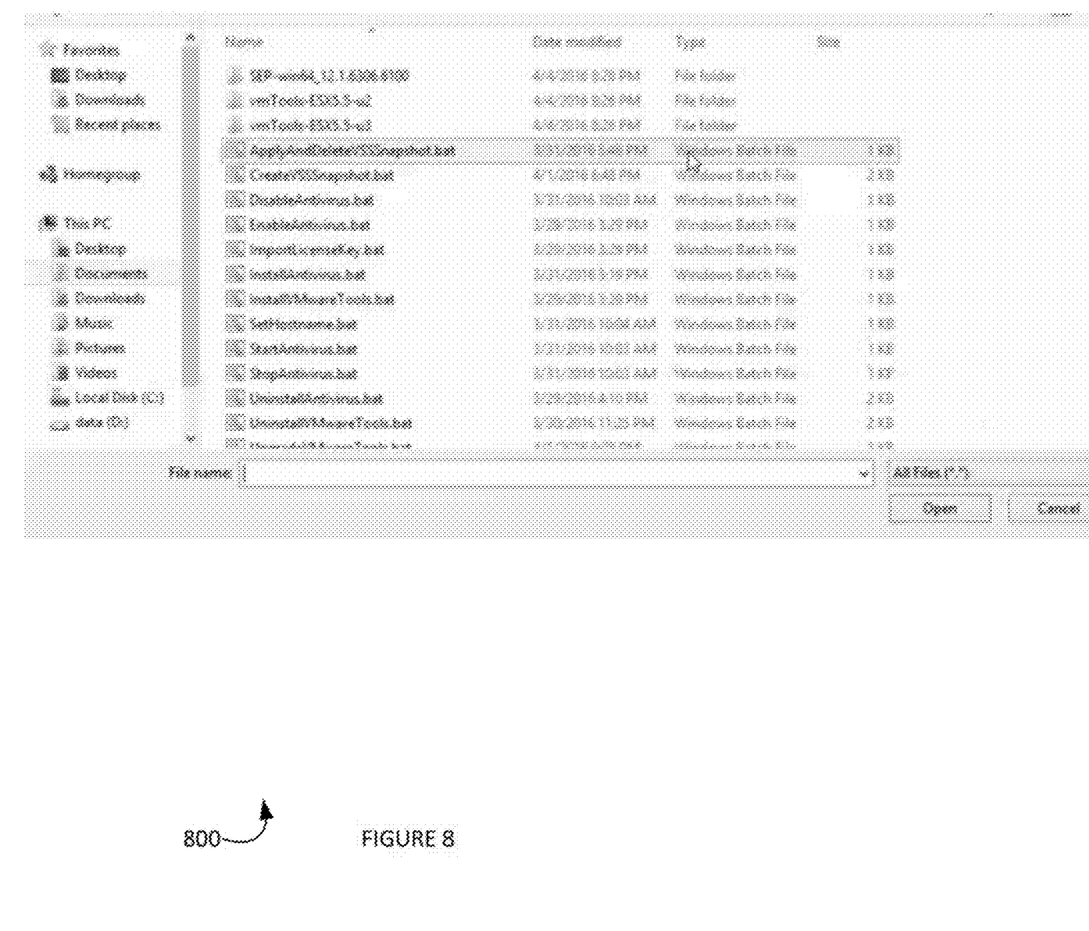
FIG. 8 illustrates an example screenshot of graphical control elements that enable a user to configure various capture operations, according to s e embodiments.

FIG. 8 illustrates an example screenshot 800 of graphical control elements that enable a user to configure various capture operations, according to some embodiments. A user can upload pre/post-capture operations to a computer-storage appliance (e.g. a SUREedge® appliance etc.). A computer-storage appliance can provide storage functionality for multiple attached systems using the transparent local storage area networks paradigm. The pre/post capture scripts can be pushed to a recovery-management server before image capture. Corresponding pre/post-capture operations can be executed by computer-storage appliance software for pre/post image capture operations.

The computer-storage appliance can be used for cloud disaster recovery. For example, recovery points that are stored on the local computer-storage appliance can be replicated to the computer-storage appliance residing on a specified cloud-computing platform. The computer-storage appliance can manage the conversion from a VM format at the source to the VM format in the specified cloud-computing platform. A disaster recovery (DR) planner tool can capture the steps used to recover servers and applications at the specified cloud-computing platform. Data sent remotely can be deduped, compressed, and encrypted.

Figure 9:
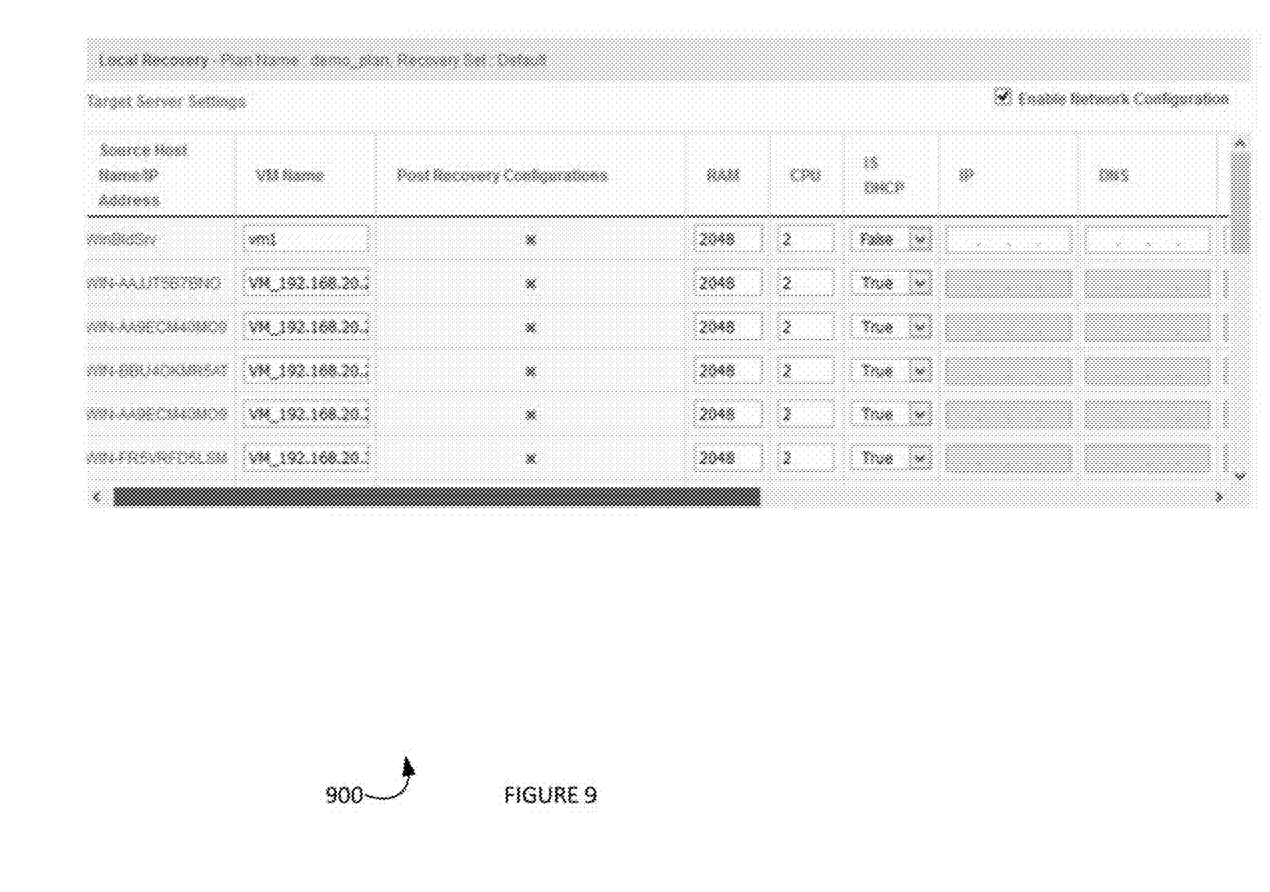
FIG. 9 illustrates an example screen shot of graphical control elements that enable a user to configure target server settings, according to some embodiments.

FIG. 9 illustrates an example screenshot 900 of graphical control elements that enable a user to configure target server settings, according to some embodiments. At the time of server image recovery, a user can specify VM name, RAM, CPU, post-recovery operations, network settings, virtual disk type (e.g. thin/thick to create), etc.

Figure 10:
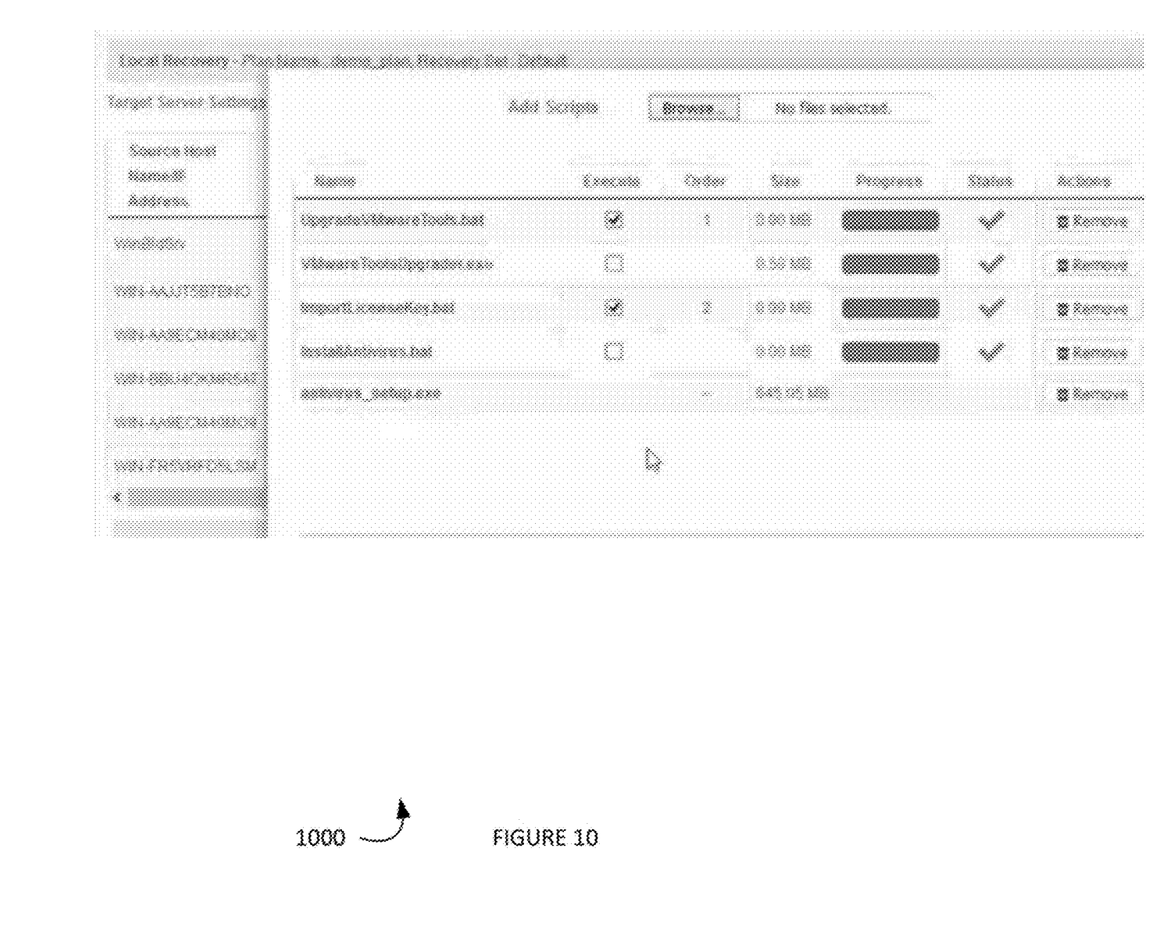
FIG. 10 illustrates an example screen shot of graphical control, elements that enable a user to configure post-recovery operations of recovered servers, according to some embodiments.

FIG. 10 illustrates an example screenshot 1000 of graphical control elements that enable a user to configure post-recovery operations of recovered servers, according to some embodiments. The post-recovery operations can be executed in the recovered server (e.g. when it is first booted). Post-recovery operations can be, inter alia: adding software of the recovered server, adding monitoring tools to the recovered server, adding antivirus software to the recovered server, etc. A user can also specify the disk or software from which to install these software packages and/or tools. A user can specify multiple post recovery operations. A user can upload post recovery operations to the computer-storage appliance. The post recovery operations can include a script to execute and/or an optional installer package used by the script. A user can define the order which these multiple post recovery operations are to be executed in recovered server. FIGS. 3-10 are provided by way of example and not of limitation.

Exemplary Computer Architecture and Systems

Figure 11:
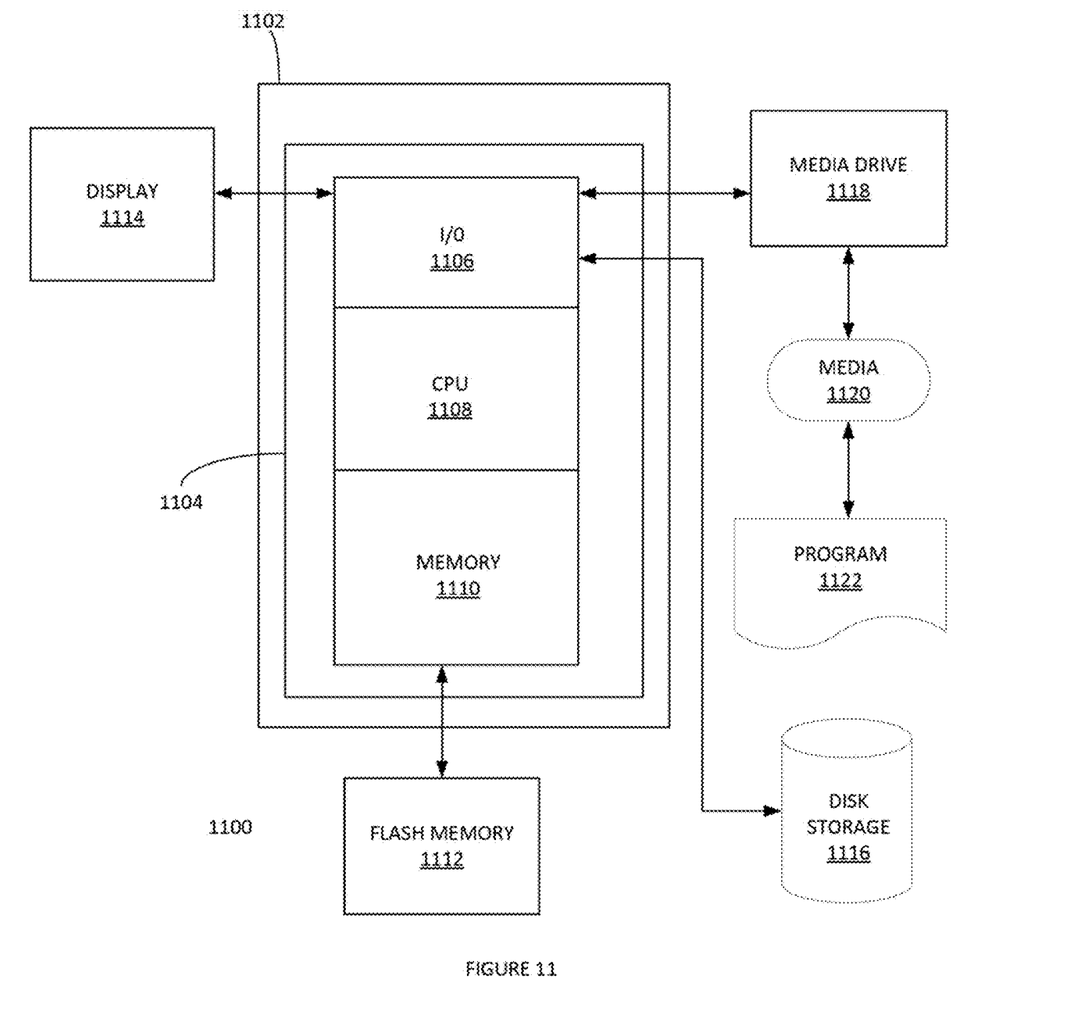
FIG. 11 depicts an exemplary computing system that can be configured to perform any one of the processes provided herein.

FIG. 11 depicts an exemplary computing system 1100 that can be configured to perform any one of the processes provided herein. In this context, computing system 1100 may include, for example, a processor, memory, storage, and I/O devices (e.g., monitor, keyboard, disk drive, Internet connection, etc.). However computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or so combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth® (and/or other standards for exchanging data over short distances includes those using short-wavelength radio transmission), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method for server migration comprising:
    connecting to a data capture utility to a set of servers;
    identifying an application and mapping the application to a subset of servers of the set of servers that are to be migrated to a specified cloud-computing platform, wherein an administrator utilizes a dashboard view provided in a web browser to identify the subset of servers;
    providing a pre-capture operation and post-capture operation as a set of scripts to execute inside the subset of servers of the set of servers to be migrated upon the pre-capture operation and the post capture operation;
    providing a sequence of migration steps to manage a migration of the subset of servers to the specified cloud-computing platform, wherein the administrator utilizes the dashboard view to generate a plan for migration of the subset of servers;
    selecting a set of attributes, wherein the set of attributes comprises a CPU, memory, a network setting, a recovery region in the specified cloud-computing platform, a disk format, and a logical volume manager devices of the subset of servers;
    automatically executing a set of post-recovery operations as a set of dependency modules associated with the subset of servers of the set of servers; and
    installing the post-recovery operations installed as a set of dependency modules upon migration of the subset of servers.

2. The computer-implemented method of claim 1 further comprising:
    automatically pushing a set of programs and executing the set of programs remotely on the subset of servers before and after the capture operation.

3. The computer-implemented method of claim 1 further comprising:
    automatically enumerating dependencies as per the application running on the subset of servers.

4. The computer-implemented method of claim 3 further comprising:
    automatically recovering the subset of servers as per an application dependency in the specified cloud-computing platform.

5. The computer-implemented method of claim 1 further comprising:
    automatically pushing the set of programs and executing the set of programs remotely as part of post-recovery operations on the recovered subset of servers on cloud-computing platform.

6. The computer-implemented method of claim 5, wherein the set of dependency modules, comprises an antivirus software program, a hypervisor tool, application license, operating system license and a cloud-computing platform monitoring tool.

7. The computer-implemented method of claim 1, wherein the administrator specifies a disk format, thin-provisioned or thick-provisioned, of the subset of recovered servers.

8. The computer-implemented method of claim 1 wherein the sequence of migration steps comprises:
    capturing a set of images of the subset of servers with an image-capture utility pushed to the subset of servers;
    replicating the set of images to a set of local storage appliances in a dedupe-storage format; and replicating the set of images to a remote storage appliance in the cloud-computing platform.

9. The computer implemented method of claim 1, wherein the pre-capture operation comprises a stop monitoring tools operation.

10. The computer-implemented method of claim 1, wherein the post-capture operation comprises a start monitoring tools operations.

11. A computer-implemented method for migrating server data to a cloud-computing environment comprising:
   enabling an administrator to use a web browser connected to a migrator software application is add an image capture utility to a server and generate a plan for server migration;
   capturing an image of the server with the image-capture utility;
   replicating the image to a local storage in a dedupe-storage format;
   replicating the image to a remote storage; appliance;
   recovering the server in a target computing environment using the replicated image, wherein the target computing environment comprises a cloud-computing environment; and
   generating a set of relevant scripts that provide a set of attributes and a functionality of the server, wherein the set of attributes comprises a CPU, memory, a network setting, a recovery region in the specified cloud-computing platform, a disk format, and a logical volume manager devices of the subset of servers.

12. The computer-implemented method of claim 11 further comprising:
   storing the set of relevant scripts in an administrator's computing system.

13. The computer-implemented method of claim 11, wherein after the server is in a recovered state on the target environment, pushing the set of relevant scripts to the server in the recovered state from the administrator's computing system.

14. The computer-implemented method of claim 13 further comprising:
   remotely executing the set of relevant scripts in the server in the recovered state.

15. A computer-implemented method for server migration comprising:
   connecting a data capture utility to a set of servers;
   identifying an application and mapping the application to a subset of servers of the set of servers that are to be migrated to a specified cloud-computing platform, wherein an administrator utilizes a dashboard view provided in a web browser to identify the subset of servers;
   providing a pre-capture operation and post-capture operation as a set of scripts to execute inside the subset of servers of the set of servers to be migrated upon the pre-capture operation and the post capture operation;
   providing a sequence of migration steps to manage a migration of the subset of servers to the specified cloud-computing platform, wherein the administrator utilizes the dashboard view to generate a plan for migration of the subset of servers;
   selecting a set of attributes wherein the set of attributes comprises a CPU, memory, a network, a recovery region in the specified cloud-computing platform, a disk format, or a logical volume manager devices of the subset of servers;
   automatically executing a set of post-recovery operations as a set of dependency modules associated with the subset of servers of the set of servers; and
   installing the post-recovery operations installed as a set of dependency modules upon migration of the subset of servers.

\* \* \* \* \*